United States Patent
Saito et al.

(10) Patent No.: US 6,304,308 B1
(45) Date of Patent: Oct. 16, 2001

(54) LIQUID CRYSTAL DISPLAY DEVICE WITH OPTICAL SHIELD FILM

(75) Inventors: Katsutoshi Saito, Mobara; Syoichi Hirota, Hitachi; Iwao Takemoto, Mobara; Toshio Miyazawa, Chiba; Katsumi Matsumoto, Mobara, all of (JP)

(73) Assignees: Hitachi, Ltd., Tokyo; Hitachi Device Engineering Co., Ltd., Chiba-ken, both of (JP)

( * ) Notice: Subject to any disclaimer, the term of this patent is extended or adjusted under 35 U.S.C. 154(b) by 0 days.

(21) Appl. No.: 09/370,245

(22) Filed: Aug. 9, 1999

(30) Foreign Application Priority Data

Aug. 10, 1998 (JP) .................................. 10-226016

(51) Int. Cl.⁷ ......................... G02F 1/1339; G02F 1/1333
(52) U.S. Cl. ......................... 349/155; 349/153; 349/156; 349/157; 349/110
(58) Field of Search .................................. 349/153, 155, 349/156, 84, 110, 157

(56) References Cited

U.S. PATENT DOCUMENTS

| | | | |
|---|---|---|---|
| 4,362,771 | * 12/1982 | Umeda et al. | 428/1 |
| 4,639,089 | * 1/1987 | Okada et al. | 350/341 |
| 5,379,139 | * 1/1995 | Sato et al. | 359/81 |
| 5,905,559 | * 5/1999 | Fujiwara et al. | 349/190 |
| 5,940,156 | * 8/1999 | Nishiguchi et al. | 349/156 |
| 5,946,070 | * 8/1999 | Kohama et al. | 349/156 |
| 5,952,676 | * 9/1999 | Sato et al. | 257/59 |
| 5,956,112 | * 9/1999 | Fujimori et al. | 349/156 |
| 5,959,710 | * 9/1999 | Yaniv | 349/155 |
| 5,978,061 | * 11/1999 | Miyazaki et al. | 349/155 |
| 5,995,191 | * 11/1999 | Tamai et al. | 349/156 |
| 6,078,379 | * 6/2000 | Nagae et al. | 349/155 |
| 6,133,972 | * 10/2000 | Fujimori et al. | 349/86 |

* cited by examiner

Primary Examiner—James A. Dudek
Assistant Examiner—Tarifur R. Chowdhury
(74) Attorney, Agent, or Firm—Antonelli, Terry, Stout & Kraus, LLP

(57) ABSTRACT

Eliminating differences in cell gap of a liquid crystal panel is effected to prevent display irregularities while avoiding contamination of the liquid crystal material due to unwanted contact of a seal material with the liquid crystal material. To this end, the liquid crystal panel includes a first substrate DSUB having multiple pixel electrodes AL-P in the form of a matrix, a second substrate USUB opposing the first substrate with a specified gap therebetween and having one or more transparent electrodes ITO-C, a liquid crystal layer LC made of a liquid crystal material sealed in the gap between the opposing substrates, and an alignment film on at least one of inner surfaces of the first and second substrates in contact with the liquid crystal layer for controlling alignment of the liquid crystal material. A plurality of pole-like spacers SPC-P are provided in a display area of the first substrate DSUB for retaining the gap between the first and second substrates DSUB, USUB at a predefined value while providing a band or strip-like spacer SPC-S that is made of the same material as that of the pole-like spacers and is formed to surround the display area and also has a width greater than the diameter of the pole spacers along with a sealing material SL filled along the outer edges of the strip spacer SPC-S for allowing the first substrate DSUB and the second substrate USUB to be tightly bonded together.

7 Claims, 10 Drawing Sheets

FIG. 6A
FIG. 6B
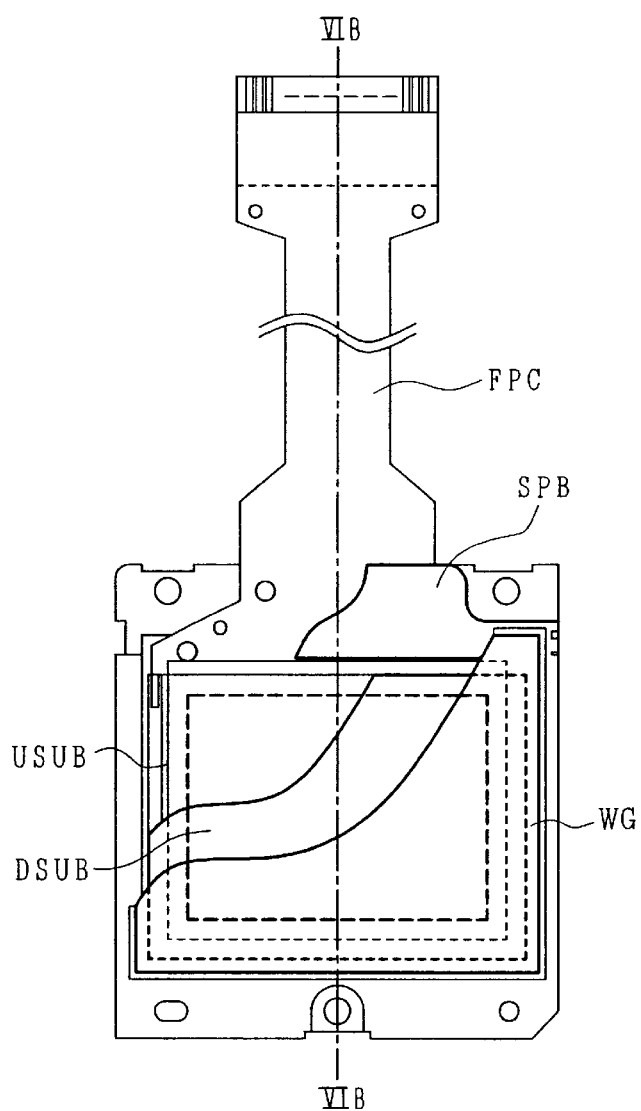
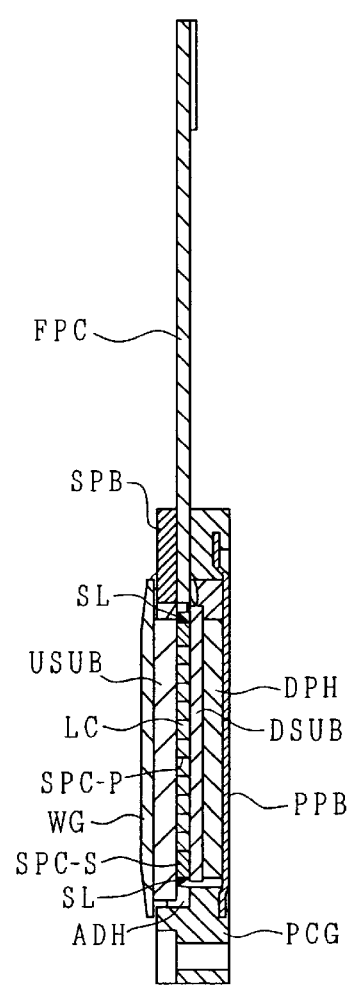

LIQUID CRYSTAL DISPLAY DEVICE WITH OPTICAL SHIELD FILM

BACKGROUND OF THE INVENTION

The present invention relates generally to liquid crystal display devices; and, more particularly, the invention relates to a liquid crystal display device that maintains a uniform gap for a liquid crystal layer, to a liquid crystal display device that can prevent optical leakage in the display area, and to a liquid crystal display device that can prevent pollution in the liquid crystal composite material by the seal agent.

Recently, display devices using a liquid crystal panel have become more widely employed as display devices which are capable of visually producing high-precision color images adaptable for use in display devices of the projection type, in notebook personal computers, in monitor units and in other similar visual representation instruments.

Currently available display devices using such a liquid crystal panel (liquid crystal display devices) typically include those of the simple matrix type, which make use of a liquid crystal panel having a liquid crystal layer sandwiched between a pair of substrates with parallel electrodes formed on respective inner surfaces in a mutual crossover fashion, and other panels of the active matrix type which employ a liquid crystal element (referred to also as "liquid crystal panel" hereinafter) that has switching elements for selection in units of pixels on only one of the pair of substrates.

Active-matrix liquid crystal display devices are generally categorized into two groups: one group includes certain liquid crystal display devices of the so-called vertical electric-field type typically including the twisted nematic (TN) scheme (also known as TN active-matrix liquid crystal display devices) configured to include an ensemble of pixel selection electrodes formed on each of a pair of upper and lower substrates, and a second group includes the so-called "lateral electric-field" liquid crystal display devices (generally called in-plane field type IPS liquid crystal display devices) using a specific liquid crystal panel with pixel select electrodes formed on only one of a pair of upper and lower substrates.

Projection liquid crystal display devices are also known as one type of liquid crystal display device application equipment. Projection liquid crystal display devices include an optical system for magnification of an image generated on a liquid crystal panel of small size to provide an enlarged image which is then projected onto a spaced-apart second screen of large size. Such projection liquid crystal display devices include devices of the transmission type and those of the reflection type, the former being designed such that two separate dielectric substrates making up a liquid crystal panel are both formed of transparent substrates, such as glass substrates by way of example, for permitting rays of light to be emitted from the back surface thereof to thereby cause resulting modulated transmission light images to be projected with enlarged sizes on an associative screen by use of an optical lens or combination thereof. On the other hand, the reflective projectors employ one of such dielectric substrates as a reflector plate for emitting light from the surface side to thereby produce an image which consists of modulated reflected light, which in turn is projected by an optical system on a screen with a magnified scale.

There are also display devices for use with notebook PCs or direct view liquid crystal display devices for display monitors, which are designed to employ as a reflector plate either one of the dielectric substrates making up the liquid crystal panel and which utilizes incoming light from the display surface side.

Typically, a liquid crystal panel constituting such a liquid crystal display device is arranged so that a liquid crystal layer made of a chosen liquid crystal material is sandwiched in a gap between two separate dielectric substrates which are bonded together, such as glass substrates, for example, and thereafter the peripheral edges thereof are sealed using a chosen seal material. The gap between two dielectric substrates is narrow and typically will measure less than 4 to 7 micrometers ($\mu$m) for instance, which gap will be collectively referred hereinafter as a "cell gap". One prior known method of retaining this cell gap is to randomly distribute spherical spacers of substantially uniform diameter, sometimes called beads, between the substrates.

Although controllability of the cell gap may readily be enhanced by increasing the requisite number of beads that are distributed, the distribution amount has generally been set at 150 pieces per square millimeter in view of the fact that random distribution of such beads inherently lacks uniformity thereby making it very difficult to completely prevent some beads from locally crowding together at a location. This can result in an increase in the number of optical dot-like dislocations, and the random bead distribution also causes an adverse reaction, such as creation of an undesired disturbance in the alignment of the liquid crystals near or around such beads, which would result in a contrast reduction becoming greater locally.

While the beads may be made of an organic polymer or quartz, use of quartz beads can cause destruction of any one of the protective films, the electrodes, and the switching elements, such as TFTs, which are fabricated on a dielectric substrate at a press-machining step for establishment of the cell gap, or alternatively result in unwanted creation of air holes or "bubbles" with a change in temperature due to a difference in the thermal expansion coefficient between the beads and a liquid crystal material being used. For this reason organic polymer beads are employed in most cases.

In direct-view liquid crystal display devices, the beads which are distributed often attempt to move or "drift" upon application of a stress to the dielectric substrate. In this respect, it will be desirable for the liquid crystal layer to be kept at negative pressures relative to the atmospheric; however, presently available manufacturing technologies make it difficult to constantly maintain such a state in which the liquid crystal panel products are constantly held in a negative pressure condition.

On the other hand, small size liquid crystal display devices for use in projector equipment are burdened with a problem in that certain beads distributed between dielectric substrates of its liquid crystal panel, which reside in the panel's display area, can unintentionally be projected on a screen as a magnified shadow image, which in turn results in a decrease in the quality of the picture images being displayed. One prior known approach to avoiding such image quality reduction is to employ what is called a "beads-less" scheme which uses a limited number of beads or fibers only at the periphery of the liquid crystal panel's display area to thereby retain the intended cell gap at such periphery only. Unfortunately, this beads-less approach suffers from a difficulty in maintaining the cell gap in the display area at a predetermined value, which can result in a decrease in the production yield and in image quality.

Further, in recent years, high-speed image displayability has been demanded, which in turn calls for establishment of so-called "narrow gap" designs for further reduction of cell gaps with increased gap control accuracies of 0.1 μm or below. As such narrow-gap designs are becoming more important, a need is felt to further increase the bead-spacer machining accuracy, which however is very difficult, especially in prior art reflective liquid crystal panels, wherein achievement of such high machining accuracy remains extremely difficult due to the fact that the cell gaps are nearly half the size of those in the devices of the transmission type.

One proposed approach to avoiding the cell-gap problem is to form, by photolithography techniques, columnar or pillar-shaped spacers (referred to hereinafter as "pole-like spacers") on a dielectric substrate at selected locations (certain portions that do not affect displayability, such as portions between adjacent pixels or alternatively those immediately underlying a black matrix) in the display area thereof, which spacers provide support between the two dielectric substrates stacked over each other to thereby render the cell gap uniform.

Use of such pole-like spacers eliminates local crowding and unwanted drift movement of distributed beads. Furthermore, as the fabrication accuracy of photolithography is significantly greater than the machining accuracy of beads by one order of magnitude or greater, the height of the pole spacers is simply determinable depending upon the thickness of the deposited photoresist film constituting these pole spacers, which in turn makes it possible to noticeably improve the cell gap accuracy.

SUMMARY OF THE INVENTION

Unfortunately, currently available photoresist materials can dissolve into a liquid crystal material, so as to undesirably reduce the electrical resistivity of the liquid crystal layer, which would result in a decrease in co-useability or "congeniality" with respect to the liquid crystal materials. Alternative use of inorganic materials therefor can result in a mismatch of the thermal expansion coefficient with the liquid crystal layer. All in all, no optimal materials adaptable for use in fabricating the intended spacers have been reported to date.

One typical prior known approach to controlling the cell gap is to mix either fibers or beads made of organic polymer or quartz as a filler into a seal material being deposited at the outer periphery of a display area. However, this approach also creates a problem in that the use of a quartz filler(s) can result in destruction of the lead terminal electrodes and/or switching circuitry, as in the case of employing beads distributed within the display area. While it is also considered effective to coat a seal material at specific portions lying outside of a switching circuitry formation region of the display area, this inherently creates a serious problem in that the resulting liquid crystal panel increases in size due to a need to reserve an extra area for seal portions. Another problem encountered in the prior art is difficultly in improving the accuracy of the cell gap because of the fact that organic polymer beads are readily collapsible; and, in view of this, it is a general approach to employ fibers for the seal portions.

A known sealing method includes the steps of coating, by use of screen printing techniques or using dispensers or the like, one of two dielectric substrates with a filler-mixed seal material in a selected region along the outer periphery of its display area, laminating the other dielectric substrate over the seal material-coated substrate, pressing these substrates together at increased pressures to permit the seal material sandwiched therebetween to sheet against the substrate surface for establishment of the intended cell gap, and then hardening the seal material sheet. A disadvantage of this method is that it remains impossible, or at least greatly difficult, to attain the required accuracy of position alignment at the seal edge portions, which results in the seal portions becoming irregular in shape. An optical blocking or shielding means must be additionally provided to preclude unintentional visualization of such an irregular seal edge shape. Especially with small size liquid crystal panels, use of such optical shield means can result in an increase in the surface area for use in sealing.

An object of the present invention is to provide an improved liquid crystal display device which is capable of eliminating display irregularities by avoiding random behavior (either local crowing or drift movement) of beads in a display area which can occur when using beads, as well as destruction of switching elements and electrodes or the like due to presence of fillers contained in beads or seal materials, along with cell gap differences in the liquid crystal panel occurring in the display area and at sealed portions, while at the same time enabling achievement of high-quality displayability by precluding contamination of a liquid crystal material due to unwanted contact between the seal material and the liquid crystal layer.

To attain the foregoing object the present invention, spaces are formed photolithographically both in a display surface area of one dielectric substrate of a liquid crystal panel constituting the liquid crystal display device and at sealed portions thereof at the same time. The spacers formed within the display area are comprised of columnar or pole-like spacers while those formed at the sealed portions consists of a zonal or band-shaped spacer which has a width which is greater than the diameter of such pole spacers. A chosen sealing material containing no fillers therein is deposited or coated at the outer periphery of this zonal spacer, which material is later hardened, thus allowing both substrates to be tightly bonded together.

With regard to the embodiments disclosed herein, some representative aspects of the invention will be summarized below.

A liquid crystal display device in accordance with the instant invention is arranged to include a first substrate having thereon a great number of pixel electrodes in the form of a matrix, a second substrate opposing said first substrate with a predefined gap defined between them, a liquid crystal layer made of a liquid crystal composition material sealed into the gap between said first and second substrates, and an optical alignment film formed on at least one of said first and second substrates in contact with said liquid crystal layer for controlling the optical orientation or alignment of said liquid crystal material, wherein the device further includes a plurality of columnar or pole-like spacers formed in the display surface area of said first substrate for retaining the size of said gap between said first and second substrates at a preselected value, while also including a zonal or band-shaped spacer made of the same material as that of said pole-like spacers for surrounding said display area and having a width greater than the diameter of said pole-like spacers, with a seal material being filled at the outer periphery of said strip-like spacer for tightly bonding said first and second substrates together. Note that providing the band spacer avoids the necessity for the seal material to contain therein beads or fibers or any equivalents thereto for use in controlling the gap between the two substrates.

With such an arrangement, the spacer's inherent random behavior within the display area may be suppressed or eliminated, thereby retaining a more uniform resultant cell gap. Another advantage is that the seal material will no longer come into contact with the liquid crystal layer thus precluding contamination of the liquid crystal material due to the presence of seal material, which in turn makes it possible to avoid destruction of the electrodes and the like due to the beads in the display area or alternatively destruction of electrode extension leads and the like at the sealed portions due to presence of fillers mixed into the seal material, thus improving the production yields and the reliability.

A further advantage is that the pole spacers stay equal in height to the band spacer with an increased accuracy to thereby enable the cell gap to be well controlled to a high accuracy over almost all regions of the display area, which in turn makes it possible to eliminate visualization irregularities during displaying of on-screen images, including flutter, moire, streaking, and pixel jitter at certain intensities.

Additionally the present invention should not be limited only to the above-noted arrangements and may alternatively be modified and altered in a variety of different forms without departing from the technical concept of the invention.

BRIEF DESCRIPTION OF THE DRAWINGS

FIG. 6A is a plan view and FIG. 6B is a cross-section on line VIB—VIB in FIG. 6A, showing an overall configuration of a projection-type liquid crystal display device incorporating an actually implemented-liquid crystal display device of the invention.

DETAILED DESCRIPTION OF THE PREFERRED EMBODIMENTS

Preferred embodiments of the present invention will be explained in detail with reference to the accompanying drawings.

Figure 1:
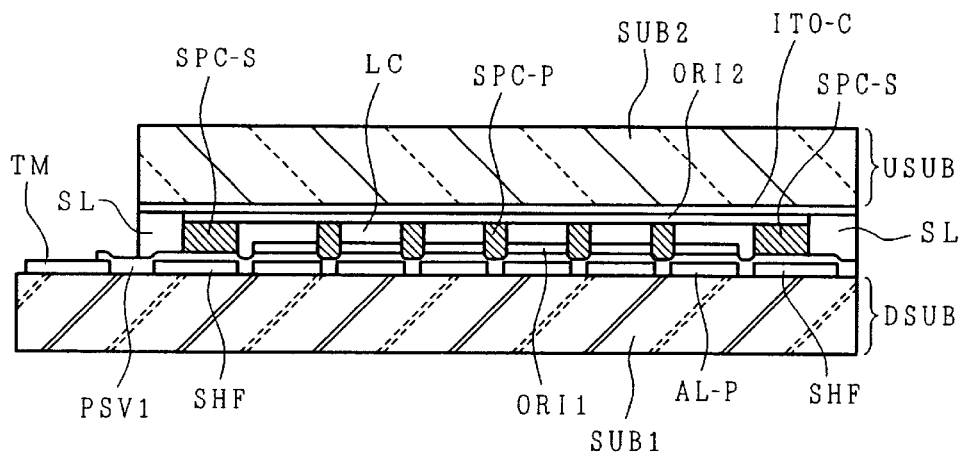
FIG. 1 is a diagram illustrating, in cross-section, a liquid crystal panel of a liquid crystal display device in accordance with one embodiment of the present invention.

Referring now to FIG. 1, there is illustrated in schematic cross section a liquid crystal panel in accordance with one embodiment of the instant invention. This liquid crystal panel is a reflective liquid crystal panel adaptable for use in projection liquid crystal display devices, wherein reference character "USUB" designates an upper-side substrate (opposed substrate) representing a first substrate; DSUB denotes a lower-side substrate (drive substrate) representing a second substrate; LC indicates a liquid crystal layer made of a chosen liquid crystal composition material; SUB2 represents the glass substrate making up the opposed substrate; ITO-C specifies a transparent electrode (common electrode, or alternatively opposed electrode); ORI2 shows an upper-side optical orientation or "alignment" film; SUB1 is a single-crystalline silicon substrate constituting the drive substrate; AL-P denotes pixel electrodes; ORI1 denotes a lower alignment film; TM denotes a terminal section; PSV1 denotes a protective film; SPC-P denotes columnar or pole-like spacers; SPC-S denotes zonal or band strip-shaped spacers; SL denotes a sealing material; and SHF denotes a light shield film.

It should be noted that the illustrated liquid crystal panel is assumed to be of the active matrix type, and that this panel also includes switching elements for pixel selection and storage capacitors or the like, not shown, on the drive substrate DSUB along with the pixel electrodes AL-P shown in FIG. 1.

The liquid crystal layer LC is sealed and sandwiched between the opposed substrate USUB with the opposed electrodes ITO-C and alignment film ORI2 formed thereon and the drive substrate DSUB on which the pixel electrodes AL-P and protective film PSV1 plus alignment film ORI1 are formed. The drive substrate DSUB is associated with the columnar or pole-like spacers SPC-P which are formed on the protective film PSV1 at selected locations excluding those of the pixel electrodes and also with the zonal or band strip-shaped spacer SPC-S that is placed at the bonding periphery the both substrates; that is, along the outer peripheral sides of a display surface area with the pixel electrodes AL-P and the like formed therein. The strip-like spacer SPC-S is designed to have a predefined width that is greater in size or dimension than the diameter of the pole spacers SPC-P to thereby receive the compressive pressures which are applied when the two substrates are bonded and pressed together during assembly for accurately retaining a cell gap between the substrates at the periphery thereof while controlling the cell gap of the display area, so that the gap is held at a predefined value in cooperation with the pole spacer SPC-P.

More specifically, upon pressing both substrates together, the resultant gap space, i.e. the cell gap of the liquid crystal layer, may be accurately controlled by the height of the pole spacers SPC-P and strip spacer SPC-S. And, sealing the liquid crystal layer into the display area or region may be achieved by a method that includes the steps of dripping a liquid crystal composition into the display region prior to lamination of the substrates and then pressing the laminated substrates when bonding them together while permitting outward draining of any extra liquid crystal material; or, alternatively, by another method including the steps of forming in advance or "preforming" an opening at part of the strip spacer SPC-S, superposing the substrates over each other, coating a chosen seal material containing therein no fillers along the outer edges of the strip spacer SPC-S, irradiating ultraviolet rays for effecting half-hardening thereof, injecting a liquid crystal material from the opening, while setting the atmosphere at a negative pressure, and thereafter effectuating pressing and thermal treatment for complete hardening of the seal material SL to thereby establish the required cell gap.

Note that, although not specifically illustrated in the drawing, in the case of a projection liquid crystal display device, the terminal section TM is connected to those terminals of a flexible printed circuit board for use in coupling electrical signals for driving the involved switching elements.

Figure 2:
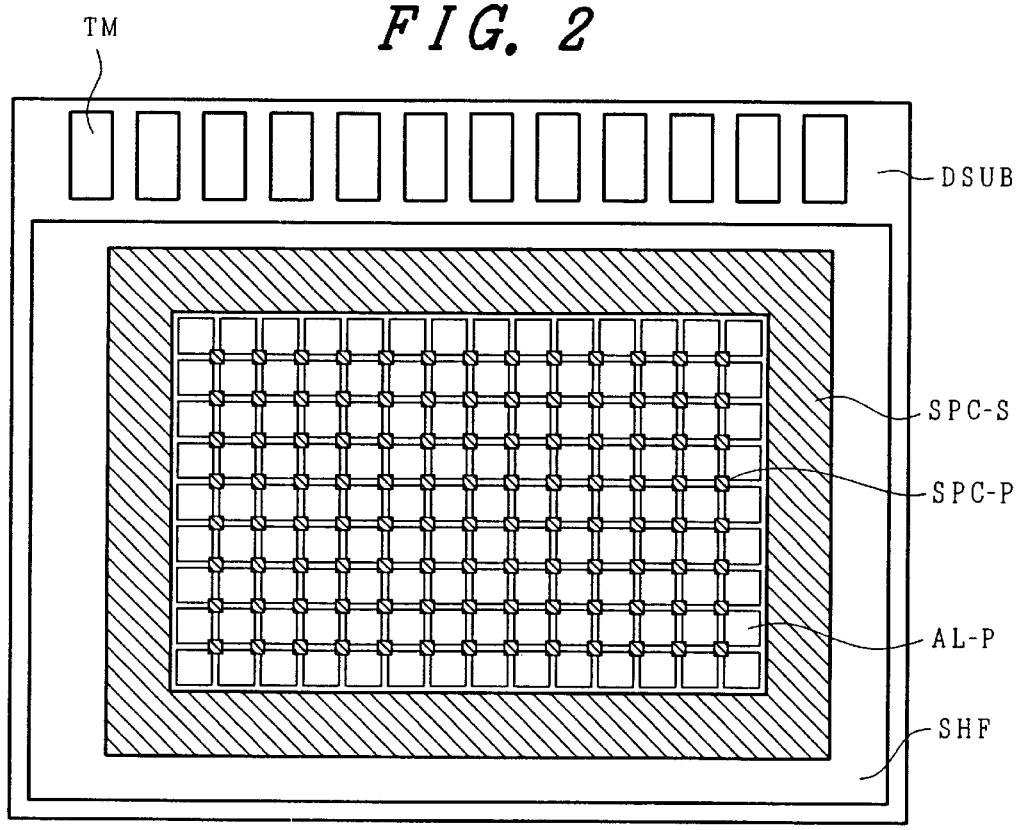
FIG. 2 is a diagram depicting a plan view of the liquid crystal panel shown in FIG. 1 for explanation of a layout of columnar spacers and a zonal spacer thereon.

FIG. 2 is a diagram showing a plan view of the liquid crystal panel shown In FIG. 1 for explanation of the planar layout pattern of the pole spacers and strip spacer. The layout of these spacers is indicated in positional relation with respect to the pixel electrodes associated therewith.

The pole spacers SPC-P that are to be formed in the display area are provided at crossover locations among the pixel electrodes AL-P. In this embodiment, providing the pole spacers SPC-P in the spaces between adjacent pixel electrodes precludes significant reduction of the aperture ratio. In addition, since it is possible to provide the pole spacers SPC-P one by one in all the spaces among pixel electrodes, the resulting setup number of such spacers is increased by one order of magnitude or greater when compared to the case of using beads to thereby permit achievement of enhanced cell gap controllability, which in turn guarantees that any positional deviation or misalignment will no longer take place between the two substrates.

The strip spacer SPC-S is formed to overlie the optical shield film SHF at the outer periphery of the display area. The optical shield film SHF is formed by the same layer as the pixel electrode. This strip spacer SPC-S is so formed as to surround the outer periphery of the display area while its width is greater than the diameter of the pole spacers SPC-P. And, this strip spacer SPC-S has the function of sealing the liquid crystal layer LC while allowing the seal material, this has traditionally been disposed in contact with the liquid crystal layer to be coated at the outer periphery of the strip spacer SPC-S.

An explanation will next be given of a method of forming the pole spacers and the strip spacer in the illustrated embodiment.

In the embodiment, the pole spacers and the strip spacer are made of a chosen material, such as, for example, the chemical amplification negative-type resist "BPR-113" (trade name) manufactured by Kabushiki Kaisha JRS. This resist material is comprised of a specific material which is very similar to those materials which have been employed for bead spacers in prior art liquid crystal panels, in that the material will hardly attempt, after having hardened, to dissolve into the liquid crystal material, nor exhibit imbibition or swelling activities. while simultaneously offering increased adaptability or congeniality with such liquid crystal material, with the machinability also being enhanced.

Figure 3:
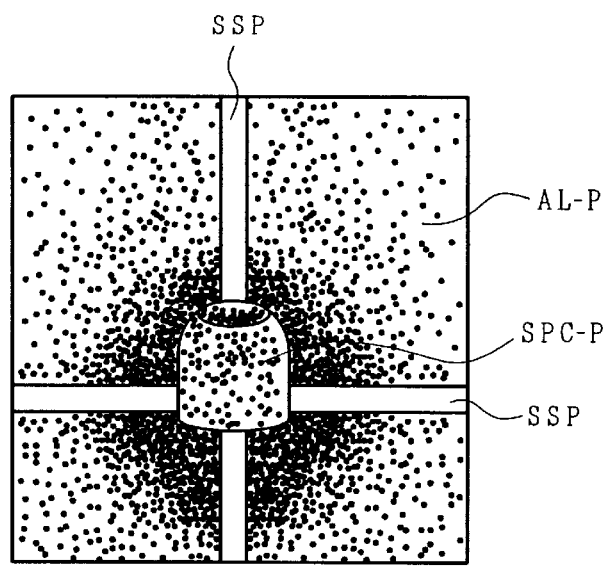
FIG. 3 is a microphotograph-based pictorial representation of a plan view of one typical columnar spacer in accordance with the invention.

FIG. 3 is a pictorial representation of the shape of a typical one of the pole spacers used in the embodiment, which has been prepared by illustrative duplication to mimic a corresponding microphotograph thereof. The pole spacer shown herein has been fabricated into a good shape at a crossing point or "intersection" of the spacers SSP between the pixel electrodes AL-P.

The "BPR-113" that becomes the material of the pole spacers and strip spacer is deposited by spin coat techniques on the protective film PSV1 (see FIG. 1) of the drive substrate DSUB with the pixel electrodes AL-P formed thereon; then, the resultant structure is irradiated with i-rays; and next, development for fabrication is effected.

The liquid crystal material is injected into the space surrounded by the strip spacer SPC-S of the drive substrate DSUB with the pole spacers and strip spacer formed thereon. In the case where the strip spacer SPC-S has the shape as shown in FIG. 2, the liquid crystal material dropped into the space. The common substrate USUB is positioned while preventing it from coming into contact with the upper part of this drive substrate DSUB; and then, de-gas processing is carried out. After having removed any gases, both substrates are laminated over each other and are then processed together at increased pressures for tight contact with each other. At this time, any extra components of the liquid crystal material behave to overflow or extrude out of the strip spacer SPC-S. These extra extruded liquid crystal material components are washed out; then, the seal material SL that contains no fillers is deposited along the outer edges of the strip spacer SPC-S and between both substrates and is then hardened.

In the illustrative embodiment, use of the pole spacers SPC-P and the strip spacer SPC-S fabricated under the same conditions ensures that the cell gap in the display area is equal to that at the sealed portions, which in turn makes it possible to eliminate undesired creation of display image irregularities otherwise occurring due to any possible cell gap differences. In addition, the liquid crystal material constituting the liquid crystal layer LC will no longer come in direct contact with the seal material being used, which in turn enables preclusion of contamination of the liquid crystal material due to the presence of a non-hardened or uncured part of the seal material; and in addition, it is no longer required that the seal material contain fillers therein, which guarantees that the electrode extension terminals are hardly open-circuited, while minimizing the risks of destruction of other thin-films.

Figure 4:
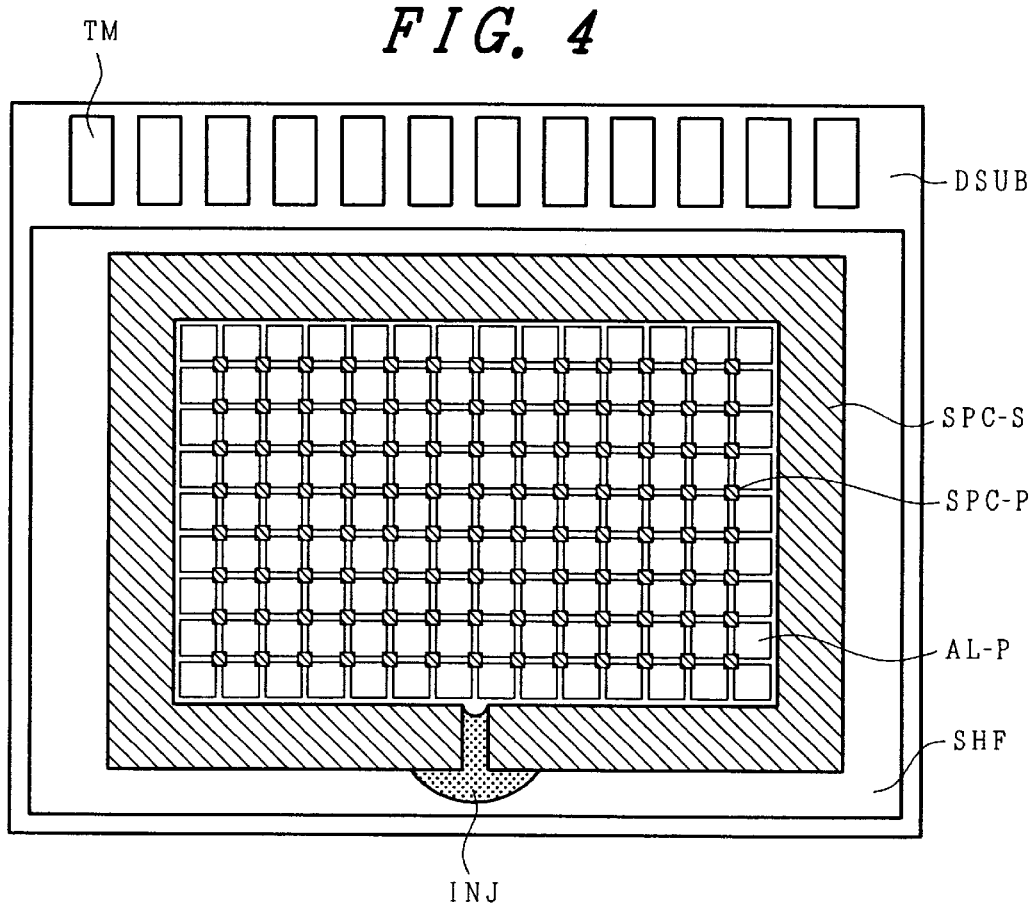
FIG. 4 is a diagram showing a plan view of a liquid crystal panel of a liquid crystal display device in accordance with a second embodiment of the invention, for explanation of a layout of columnar spacers and a zonal spacer thereon.

FIG. 4 depicts a plan view of a liquid crystal panel used in a liquid crystal display device in accordance with a second embodiment of this invention, which panel has on its surface pole spacers and a strip spacer formed into a planar pattern as shown herein. This embodiment is arranged so that a gap is provided at part of the strip spacer SPC-S formed at the outer periphery of the display area for use as a liquid crystal injection port INJ. The remaining arrangement of the embodiment is similar to that of said first embodiment and thus a further explanation thereof will be omitted herein. A manufacturing method of the liquid crystal panel of this embodiment will be explained below.

Fabrication of the drive substrate DSUB may be similar in principle to—that of said first embodiment except that a process step is added of providing the liquid crystal injection port INJ in the strip spacer SPC-S. The opposed substrate USUB is bonded to this drive substrate DSUB; and then, the substrate are pressed together at high pressures to thereby bring these substrates into tight contact with each other. Under this condition, the atmosphere is pressure-reduced for gas removal; and then, the liquid crystal material is injected thereinto from the liquid crystal injection port INJ. Thereafter, a chosen seal material is deposited along the outer edges of the strip spacer SPC-S including the liquid crystal injection port INJ; and then, it is allowed to harden.

Alternatively, a similar seal material may be deposited at the liquid crystal injection port INJ for sealing prior to deposition of the seal material at the outer edges of the strip spacer SPC-S. Note that the liquid crystal injection port INJ may be replaced with an array of two or more liquid crystal injection ports INJ where appropriate. The present embodiment is capable of attaining similar effects and advantages to those of said first embodiment.

It is noted that, although in both of the respective embodiments referred to above, the drive substrate DSUB has been described to be of the reflection type using a single-crystalline silicon substrate, a similar arrangement may also be achieved either in the case of liquid crystal display devices of the transparent type with both substrates formed as glass substrates or in the case of direct-view liquid crystal display devices with large display screen areas.

Figure 5:
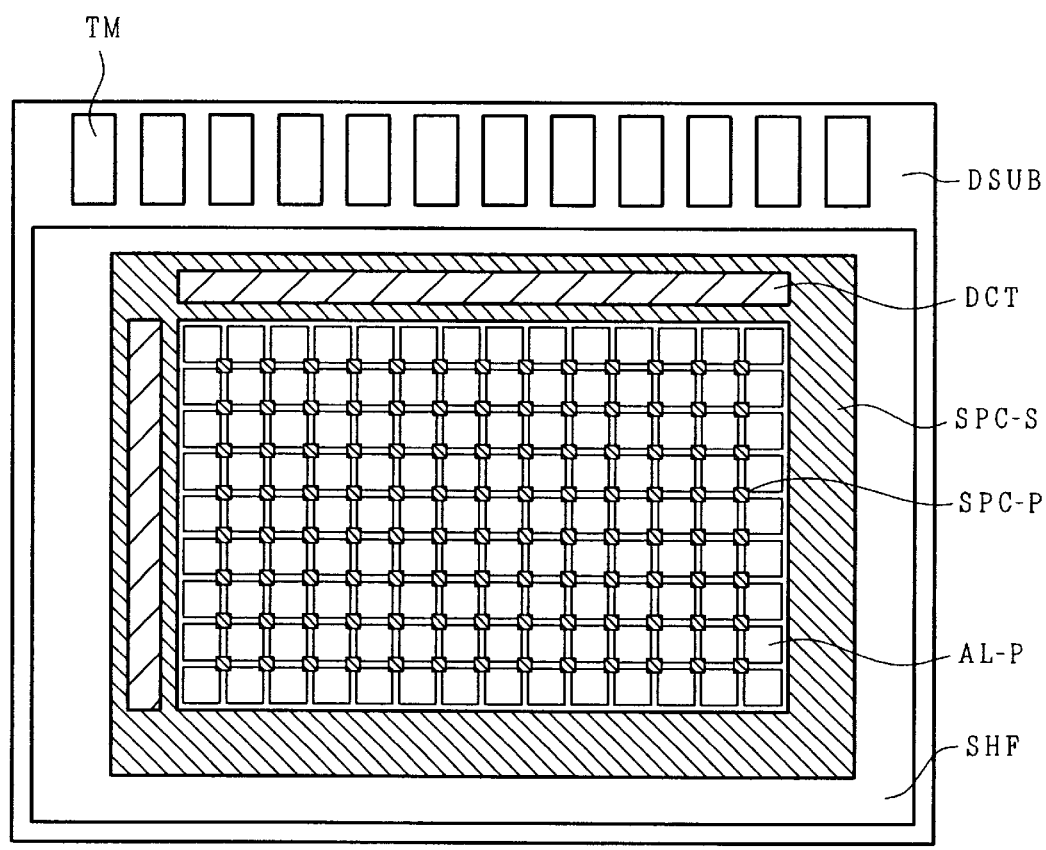
FIG. 5 is a diagram showing a plan view of a liquid crystal panel of a liquid crystal display device in accordances with a third embodiment of the invention, for explanation of a layout of columnar spacers and a zonal spacer thereon.

FIG. 5 is a plan view of a liquid crystal panel used in a liquid crystal display device in accordance with a third embodiment of this invention, for explanation of the layout of pole spacers and a strip spacer thereon. This embodiment is arranged such that a built-in driver circuit DCT is directly mounted on the drive substrate DSUB at a location outside of the display surface area thereon, while letting the strip spacer SPC-S be formed overlying this driver circuit DCT. The pole spacers SPC-P are similar in nature to those in the first embodiment.

With this embodiment the same effects and advantages as those of the above-noted respective embodiments are obtainable; and additionally, it is possible to achieve a small-area liquid crystal display device as a whole because of the fact that a space for driver circuitry to be mounted externally of the liquid crystal panel may be omitted.

An explanation will next be given of some examples which are obtainable by implementation of each embodiment stated supra.

FIGS. 6A and 6B show an overall arrangement of a liquid crystal display device of the projection type employing an actually implemented example of the liquid crystal display device in accordance with the invention, wherein FIG. 6A is a partly cutaway plan view, whereas FIG. 6B is a cross-section taken along line VIB—VIB of FIG. 6A.

As shown in the drawing, this projection liquid crystal display device is arranged to have on its second substrate DSUB multiple pole-like spacers SPC-P and a strip spacer SPC-S with a liquid crystal layer LC sandwiched between a first substrate USUB and the second substrate DSUB for controlling the required cell gap using the pole spacers SPC-P and the strip spacer SPC-S. The reflective liquid crystal panel having a seal material SL coated along outer edges of the strip spacer SPC-S, which is then hardened for tightly bonding both substrates together, is received inside of the cavity of a package PCG. The package PCG may preferably be constituted from a mold-machined product made of resin materials, and a flexible printed circuit board FPC for use in supplying one or more signals along with electrical power to one edge thereof is connected thereto at its one end. The package PCG is provided with a surface glass WG employed for covering the cavity to thereby provide a sealed environment therein.

A heat release or heat sink plate PPB made of a chosen metal is disposed on the back surface of the package PCG in a manner such that the heat sink has its peripheral portions embedded therein at four lower sides of the package main body PCG while letting the liquid crystal panel be received with a comparatively elastic or resilient heat radiator sheet DPH placed between it and the heat sink PPB. Accordingly, the back surface of the liquid crystal panel comes into tight contact with the heat sink PPB via the heat radiator sheet DPH to thereby provide the intended structure with enhanced heat radiation effects.

The liquid crystal panel that is housed inside of the cavity of the package PCG is fixed by adhesive ADH to a step-like portion on the back side of the first substrate USUB thereof, which portion is formed at the inner periphery on the bottom of this package PCG, while the surface glass WG is adhered to a space plate SPB for fixing the package PCG and flexible printed circuit board FPC together. Note here that the space plate SPB is bonded to the flexible printed circuit board FPC by adhesive, not shown.

Figure 7:
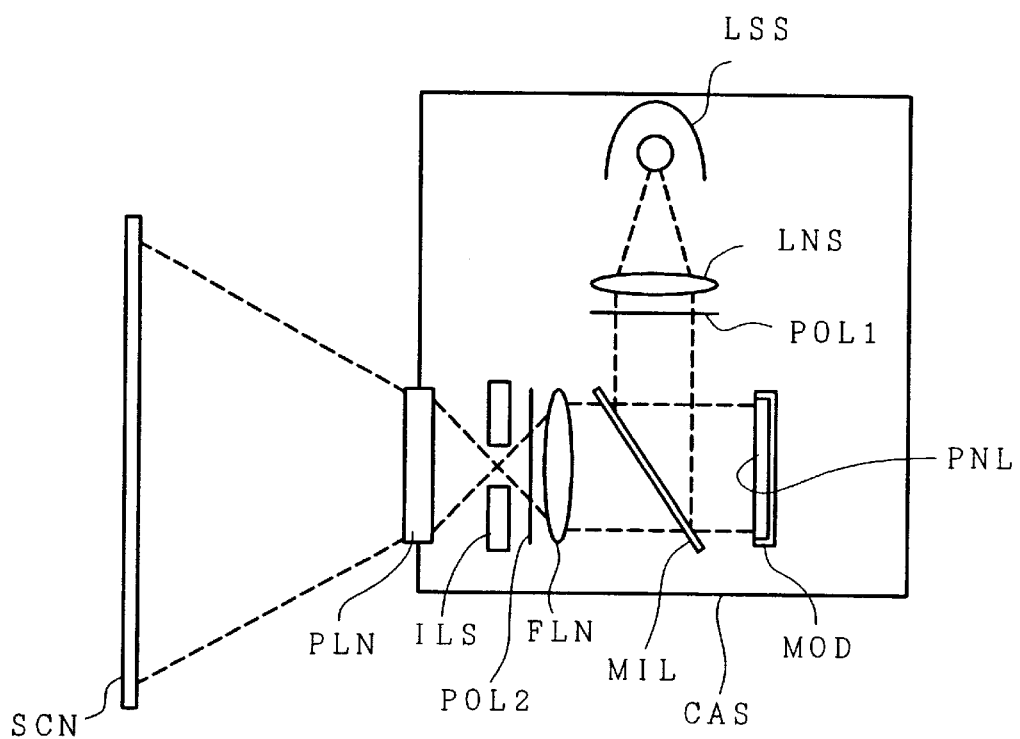
FIG. 7 is a diagram schematically depicting one exemplary structure of the projection liquid crystal display device employing the liquid crystal display device shown in FIG. 6.

FIG. 7 is a pictorial representation for explanation of one exemplary configuration of a projection liquid crystal display device using the liquid crystal display device that has been explained in conjunction with FIG. 6, which includes housing, CAS a liquid crystal display device (liquid crystal module) MOD, illumination light source LSS, illumination lens system LNS, first optical polarizer plate POL1, reflection mirror MIL, focusing lens system FLN, second optical polarizer plate POL2, optical diaphragm or iris ILS, and image-projection optical system PLN.

Illumination light from the light source device LSS is guided by the illumination lens system LNS and first polarizer plate POLI plus reflection mirror MIL to the surface of the liquid crystal panel PNL constituting the liquid crystal display device MOD. Light which arrives at the liquid crystal panel PNL is then subjected to modification in a way corresponding to an image signal at the pixel electrode of the liquid crystal panel PNL to thereby provide refection light which is magnified for projection onto the screen SCN by way of the focussing lens system FLN and second polarizer plate Pd2 plus iris ILS as well as projection optical system PLN.

An explanation will next be given of an example which applies the invention to a direct-view liquid crystal display device in terms of an active-matrix liquid crystal display device.

Figure 8:
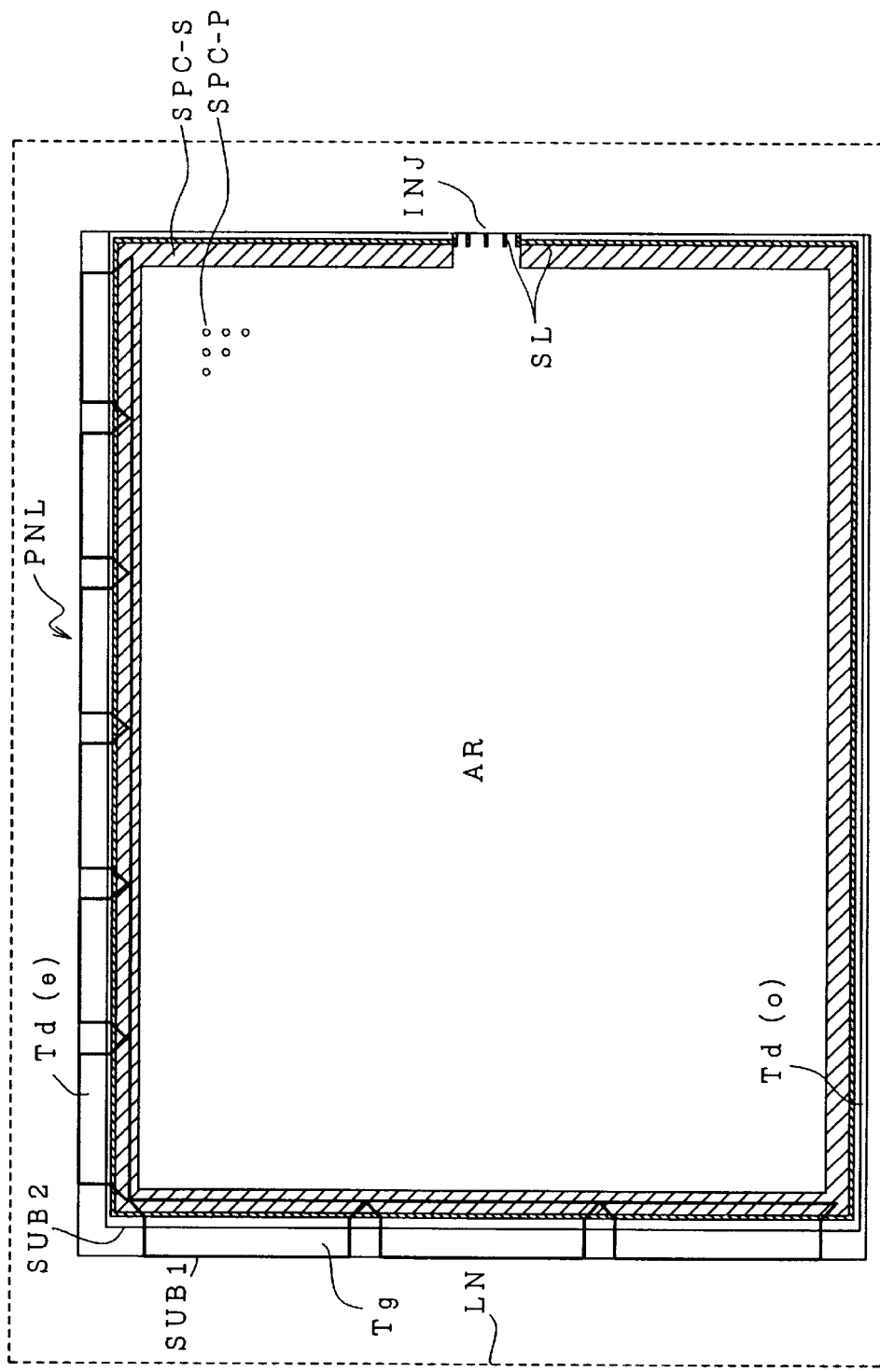
FIG. 8 is a plan view diagram of a liquid crystal panel constituting an active-matrix liquid crystal display device also incorporating the principles of the invention.
Figure 9:
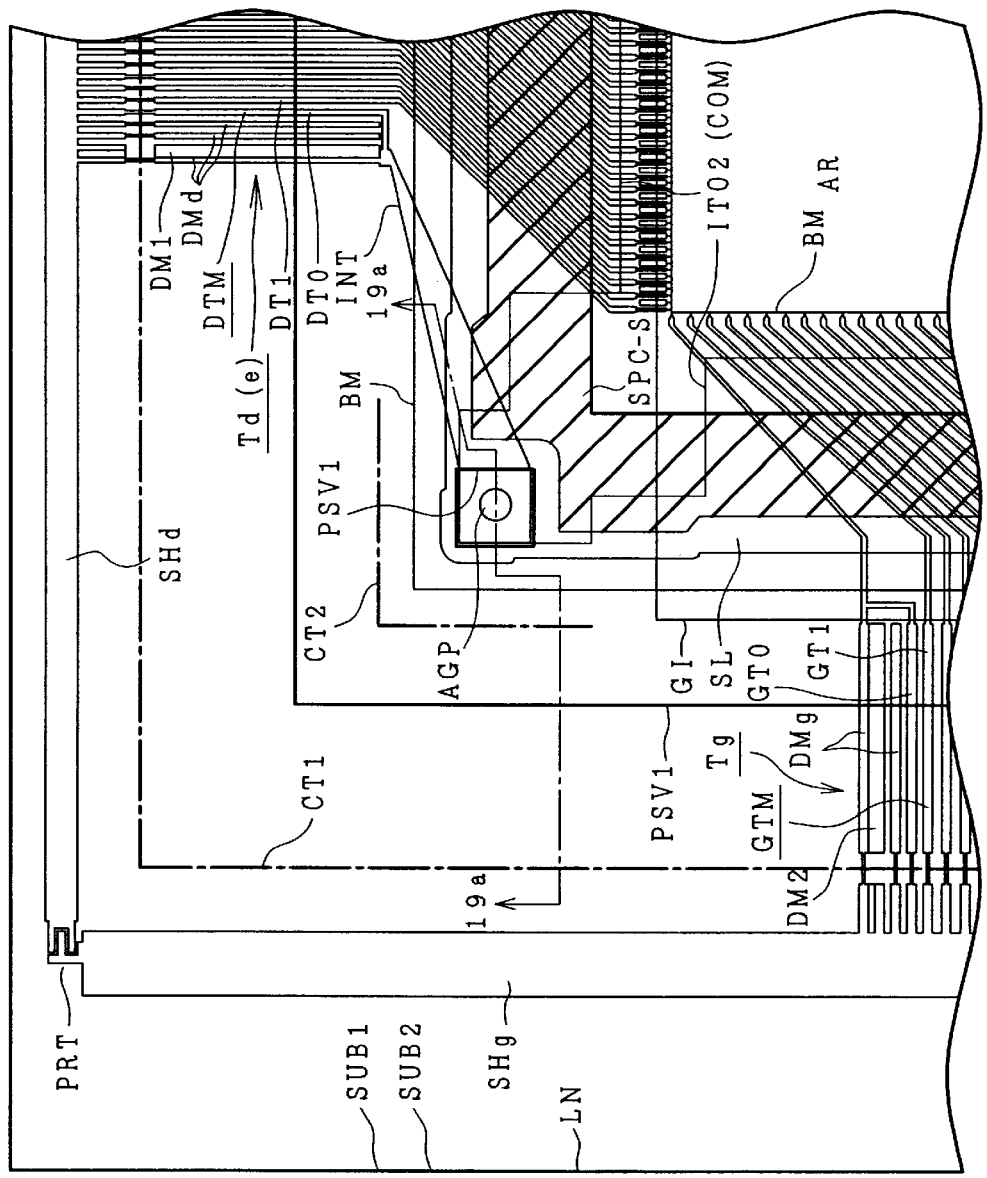
FIG. 9 is an enlarged partial plan view diagram of the liquid crystal panel shown in FIG. 8 showing the upper left part thereof and its nearby portions with a seal section SL provided thereon.

FIG. 8 is a diagram showing a plan view of a liquid crystal panel constituting the active-matrix liquid crystal display device, which depicts a main part around a matrix AR of a liquid crystal panel PNL including upper and lower transparent glass substrates SUB2 (color filter substrate), SUB1 (active-matrix substrate) which constitute the first and second substrates; and FIG. 9 is an enlarged plan view of part near a seal section corresponding to the upper left corner portion of the liquid crystal panel shown in FIG. 8.

Figure 10A:
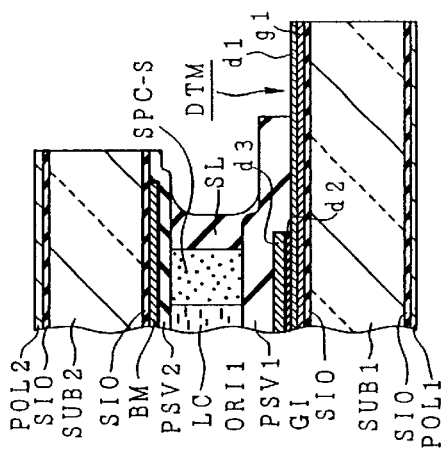
FIGS. 10A, 10B and 10C are diagram showing in cross-section main parts of a liquid crystal panel constituting the active-matrix liquid crystal display device embodying the invention.
Figure 10B:
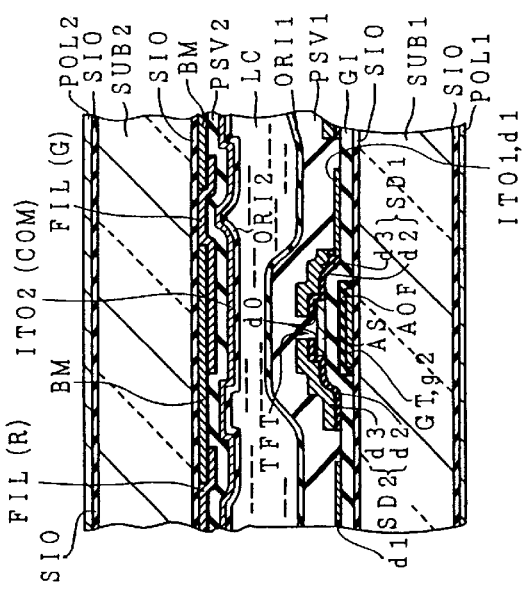
Figure 10C:
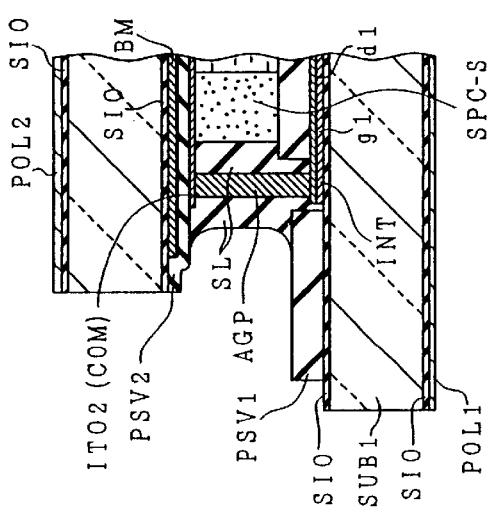

In addition, FIGS. 10A, 10B and 10C are diagrams showing in cross-section main portions of the liquid crystal panel, wherein FIG. 10A is a sectional view taken along line 19a—19a of FIG. 9, FIG. 10B is a sectional view of a TFT section, and FIG. 10C is a sectional view near an external connection terminal DTM to which image signal line driver circuitry is to be connected.

In the manufacture of this liquid crystal panel, if it is of small size, then a single glass substrate is subject to simultaneous processing of a plurality of panels at one time and is the substrate then separated into plural pieces for throughput improvement; alternatively, if it is large in size, then a specific glass substrate having its size standardized for common use with a variety of types of products is employed which is so processed and then made smaller into a proper size accommodating respective types of products for purposes of shared use of the production facility; in either case, the glass substrate is cut after having completed a series of specified process steps.

FIGS. 8 and 10 show the state after having completed a cut-off process of the upper and lower substrates SUB2, SUB1; whereas, FIG. 9 shows the state prior to the cutoff process, wherein LN designates the edge of a cut line of such glass substrate, and CT1 and CT2 denote certain positions at which the glass substrates SUB1, SUB2 are to be cut, respectively.

In either case, the finally manufactured state is such that at those portions whereat external connection terminal groups Tg, Td (suffix omitted) are located, the upper-side glass substrate SUB2 is limited in size so that it exists inside of the lower-side glass substrate SUB1 to thereby allow the terminal groups to be exposed to the outside.

The external connection terminal groups Tg, Td are such that a plurality of components consisting essentially of scan circuit connection terminals GTM and image signal circuit connection terminals DTM along with electrical extension leads associated therewith are organized into a group in units of tape carrier packages with driver circuits mounted thereon. Those extension leads of each group extending from the matrix section up to the external connection terminal unit are so designed as to become slanted or tilted as they come closer to both ends. This is aimed at positional alignment of the terminals DTM, GTM of the liquid crystal panel PNL with the connection terminal pitch at respective tape carrier packages.

Pole spacers SPC-P are formed in the display area AR between the transparent glass substrates SUB1, SUB2 whereas a strip spacer SPC-S is formed in the seal section thereof along its edges, excluding the liquid crystal seal injecting portion INJ, in a such a manner as to seal the liquid crystal LC. And, a seal material SL is coated at the outer edges of the strip spacer SPC-S. This seal material is made of an epoxy resin, for example. Note that the pole spacers SPC-P are not visible in FIG. 10 because they are formed at the boundaries of pixels.

A common transparent pixel electrode IT02 on the upper transparent glass substrate SUB2 is connected by a silver paste material SGP at least at one portion; here, at four corner edges of the liquid crystal panel to an extension lead INT that is formed on the lower transparent glass substrate SUB 1. This extension lead INT is fabricated simultaneously during formation of gate terminals GTM and drain terminals DTM.

Respective layers of alignment films ORI1, ORI2 and transparent pixel electrodes ITO1 plus common transparent pixel electrodes ITO2 are formed inside of the strip spacer SPC-S. Polarizer plates POL1, POL2 are formed on outer surfaces of the lower transparent glass substrate SUB1 and upper transparent glass substrate SUB2, respectively.

Liquid crystal LC is sealed in the display area AR which is partitioned by the strip spacer SPC-S between the lower alignment film ORI1 and upper alignment film ORI2. The lower alignment film ORI1 is formed on a protective film PSV1 on the side of the lower transparent glass substrate SUB1.

This liquid crystal panel PNL is assembled through process steps of individually stacking various layers over each other on each side of the transparent glass substrate SUB1 and transparent glass substrate SUB2, laminating the lower transparent glass substrate SUB1 and the upper transparent glass substrate SUB2 over each other, injecting a chosen liquid crystal material via the opening INJ (liquid crystal seal injection port) of the strip spacer SPC-S, thereafter sealing using the seal material SL, and then cutting the upper and lower transparent glass substrates.

A thin-film transistor TFT as shown in FIGS. 10A, 10B and 10C operates in a way such that, upon application of a positive bias to its gate electrode GT, the channel resistivity between the source and drain thereof decreases; alternatively, the source-drain resistivity increases when the bias is set at zero.

The thin-film transistor TFT of each pixel is divided into two portions (plural parts) within the pixel. In FIG. 10B only one of them is depicted. Each of the two thin-film transistors TFT is arranged to have substantially the same size (equal in channel length and in channel width). Each of such divided thin-film transistors TFT has a gate electrode GT, gate insulation film GI, i-type semiconductor layer AS made of intrinsic amorphous silicon (Si) with no conductivity type determination impurities doped therein, and a pair of source electrode SD1 and drain electrode SD2. Note here that the source and drain are inherently determined depending on the bias polarity between them, and that such polarity will possibly be inverted in this liquid crystal display device so that the source and drain are interchangeable in nature. In the following explanation however, one of them is fixedly represented by the source with the other called the drain for purposes of convenience in the discussion herein.

The gate electrode GT is designed to extend beyond respective active regions of the thin-film transistor TFT while respective gate electrodes GT of the thin-film transistors TFT are formed continuously. Here, the gate electrode GT is formed of a single-layer second conductive film g2. The second conductive film g2 may be made for example of an aluminum (Al) film as formed by sputtering techniques to a predetermined thickness ranging from 1,000 to 5,500 Angstroms (Å). In addition, an anodized film AOF of aluminum is provided on the gate electrode GT.

This gate electrode GT is formed to have a slightly larger size than the i-type semiconductor layer AS to thereby completely cover it (when looking from the lower side thereof). Accordingly, in case a backlight BL, such as a fluorescent tube, is attached to the lower part of the lower transparent glass substrate SUB1, the gate electrode GT consisting of such opaque aluminum film serves to block rays of light emitted from the backlight BL thus preventing the light from falling onto the i-type semiconductor layer AS, which in turn makes it possible to minimize the possibility of conduction phenomena due to light irradiation, i.e. reduction of the turn-off characteristics of the thin-film transistor TFT. Additionally, the inherent size of the gate electrode GT is such that it has a width minimally required to allow the gate electrode to span or "bridge" between the source electrode SD1 and drain electrode SD2 (also including margins for position alignment between the gate electrode GT and the source and drain electrodes SD1, SD2) whereas the depth thereof which determines the resultant channel width W is determinable depending on how the ratio of it to a distance (channel length) L between the source electrode SD 1 and drain electrode SD2; namely a factor W/L determining the mutual conductance or transconductance gm is designed. Obviously the actual size of the gate electrode GT in this liquid crystal display device is made greater than the inherent size noted above.

Scan signal lines are constituted from a second conductive film g2. This second conductive film g2 of such scan signal lines is fabricated simultaneously during formation of the second conductive film g2 of gate electrodes GT while allowing the former to be integral with the latter. An anodized film AOF of aluminum is also provided overlying the scan signal lines.

A dielectric film GI is employed to function as the gate insulation film of each of the thin-film transistors TFT, and is formed to overlie the gate electrodes GT and scan signal lines. The dielectric film GI is made for example of a silicon nitride film fabricated by plasma chemical vapor deposition (CVD) techniques to a thickness of from 1,200 to 2,700 Å (preferably 2,000 Å in this liquid crystal(display device). As shown in FIG. 9, the gate insulation film GI is so formed as to entirely surround a matrix section AR with its peripheral portions removed away thus allowing the external connection terminals DTM, GTM to be exposed to the outside.

The i-type semiconductor layer AS is used as a channel formation region of each of two thin-film transistors TFT. The i-type semiconductor layer AS is formed of either an amorphous silicon film or a polycrystalline silicon film of about 200 to 220 Å in thickness (about 200 Å thick in this liquid crystal display device).

This i-type semiconductor layer AS is fabricated continuously to effect formation of the dielectric film GI made of $Si_2N_4$ for use as the gate insulation films while varying feed gas components in the same plasma CVD equipment without causing external exposure from such plasma CVD equipment.

In addition, an N(+) type semiconductor layer d0 with a chosen impurity for ohmic contact such as phosphorus (P) doped therein at 2.5% is also formed continuously to a thickness ranging from 200 to 500 Å (about 300 Å in this liquid crystal display device). Thereafter, the lower transparent glass substrate SUB1 is removed from the CVD apparatus to the outside to carry out photolithographical patterning processes so that the N(+) type semiconductor layer d0 and i-type semiconductor layer AS are patterned into several independent islands.

The i-type semiconductor layer AS is also provided between both intersections (crossover portions) of the scan signal lines with respect to image signal lines associated therewith. The i-type semiconductor layer AS at the intersections acts to reduce electrical short-circuiting between the scan signal lines and the image signal lines at such intersections.

A transparent pixel electrode ITO1 (corresponding to AL-P in FIG. 1) constitutes one of those pixel electrodes of the liquid crystal panel. The transparent pixel electrode ITO1 is connected to the source electrode SD1 of each of the two thin-film transistors TFT. Due to this, even where a defect occurs at any one of such two thin-film transistors TFT, the operation reliability may be guaranteed in a way such, that if such defect can result in secondary operation failures or malfunction, then an appropriate portion is cut away, such as by laser light, otherwise no particular actions will be taken due to the fact that the remaining thin-film transistor TFT is operating normally. Additionally, it will rarely happen that both of two thin-film transistors TFT experience defects at the same time, so that use of the redundancy scheme makes it possible to greatly reduce the possibility of occurrence of point defects and/or line defects.

The transparent pixel electrode ITO1 is comprised of a first conductive film d1. This first conductive film d1 is made of a transparent conductive film (indium-tin-oxide or ITO film, or Nesa film) that was formed by sputtering techniques to a thickness of from 1,000 to 2,000 Å (about 1,400 Å in this liquid crystal display device).

The source electrode SD1 and drain electrode SD2 of each of the two thin-film transistors TFT are provided so as to be spaced apart from each other on the i-type semiconductor layer AS.

The individual one of the source electrode SD1 and drain electrode SD2 is arranged by sequentially laminating or stacking a second conductive film d2 and third conductive film d3, as seen from the lower layer side, in contact with the N(+) type semiconductor layer d0. The second conductive film d2 and third conductive film d3 of the source electrode SD1 are fabricated at the same process step or steps during formation of the second conductive film d2 and third conductive film d3 of the drain electrode SD2.

The second conductive film d2 may be a chromium (Cr) film that is formed to a thickness of 500 to 1,000 Å (approximately 600 Å in this liquid crystal display device). The Cr film is adapted for use as a so-called barrier layer to be described later, which prevents unwanted outdiffusion of aluminum Al of the third conductive film d3 into the N(+) type semiconductor layer d0. The second conductive film d2 may be made of, in the alternative, a Cr film, a film of high-melting-point metal (Mo, Ti, Ta, W, and the like), a layer of high-melting-point suicide ($MoSi_2$, $Tisi_2$, $TaSi_2$ $WSi_2$ or else), or any other similar suitable materials.

The third conductive film d3 is formed by sputtering of aluminum Al to a thickness of from 3,000 to 5,000 Å (about 4,000 Å in this liquid crystal panel). Aluminum Al films are less in stress than chromium Cr films and for this reason are capable of formation to large film thicknesses while being arranged to reduce the electrical resistance values of the source electrode SD1 and drain electrode SD2, as well as the image signal lines DL. The third conductive film d3 may alternatively be made from, other than ordinary aluminum, an aluminum containing therein silicon or copper (Cu) as additive materials.

After completion of the intended patterning processing of the second conductive film d2 and third conductive film d3 using the same mask pattern, the N(+) type semiconductor layer do is removed by using the same mask or alternatively using the second conductive film d2 and third conductive film d3 as a mask therefor. In single terms, certain portions of the N(+) type semiconductor layer do which reside on the i-type semiconductor layer AS other than those on the second conductive film d2 and third conductive film d3 will be removed in a self-align fashion. At this time the N(+) type semiconductor layer d0 will be etched away so that its thickness portions are all removed so that the i-type semiconductor layer AS will likewise be etched away at the surface portion thereof; however, the degree of such etching treatment may be controlled based on the length of the etching processing time.

The source electrode SD1 is connected to the transparent pixel electrode ITO1. The source electrode SD1 is arranged along the i-type semiconductor layer AS's step-like difference portion (a step-like surface configuration corresponding to a film thickness equivalent to the total sum of the film thickness of the second conductive film d2 and the film thickness of the anodized film AOF plus the film thickness of the i-type semiconductor layer AS as well as the film thickness of the N(+) type semiconductor layer d0). Practically, the source electrode SD1 consists of the second conductive film d2, formed along the step-like difference of the i-type semiconductor layer AS, and the third conductive film d3 formed to overlie this second conductive film d2. The third conductive film d3 of the source electrode SD1 is arranged to permit climbing over the i-type semiconductor layer AS in view of the fact that the Cr film of the second conductive film d2 is incapable of being made thicker due to an increase in stress and also is incapable of climbing over the step-like difference of the i-type semiconductor layer AS. In other words, thickening the third conductive film d3 improves the step coverage. Since the third conductive film d3 is capable of formation to increased thicknesses, this significantly contributes to reduction of the resistance value of the source electrode SD1 (the same goes with the drain electrode SD2 and/or image signal lines DL).

A protective film PSV1 is provided so as to overlie the thin-film transistors TFT and transparent pixel electrodes ITO. The protective film PSV1 is formed in order to protect mainly the thin-film transistors TFT against moisture; to this end, the one that is high in transparency and has good resistance to humidity must be used therefor. The protective film PSV1 is made, for example, of a silicon oxide film or silicon nitride film which is formed by plasma CVD apparatus to a thickness of about 1 μm.

As shown in FIG. 9, the protective film PSV1 is formed to surround the entire matrix section AR, with its peripheral portions remove so as to allow the external connection terminals DTM, GTM to be exposed to the outside and also with those portions removed which are used to connect a common electrode COM (corresponding to the transparent electrode ITO-C of FIG. 1) of the upper transparent glass substrate SUB2 to an external connection terminal extension lead INT of the lower transparent glass substrate SUB1 using silver paste. With regard to the thickness relationship of the protective film PSV1 versus the gate insulation film GI, the former is made thicker in light of protection effect enhancement, whereas the latter is made thinner in view of the transconductance gm of the transistors. Accordingly, as shown in FIG. 9. the protective film PSV1, which is high in protection effects, is fabricated so that it is larger in size than the gate insulation film GI to ensure that its periphery offers enhanced protectability over an extended area that is as wide as possible.

On the side of the upper transparent glass substrate SUB2, an optical shield film BM is provided to prevent unwanted entry or incidence of incoming external light into the i-type semiconductor layer AS that is used as the channel formation region.

The optical shield film BM is made of either an aluminum film or chromium film or any equivalents thereof, which, is high in optical blocking ability. In this liquid crystal display device, the chromium film is formed by sputtering to a thickness of 1,300 Å, more or less. Additionally this shield film is different from the shield film SHF in FIG. 1.

Consequently, the i-type semiconductor layer AS of thin-film transistor TFT is sandwiched between the overlying shield film BM and the underlying gate electrode GT of slightly larger size so that such portion will no longer receive any externally attendant natural light nor any rays of back-light. As indicated by hatching in FIG. 19, the shield film BM is formed around a pixel; in other words, the shield film BM is formed to have a lattice or grid-like pattern (known as black matrix), which grid defines by partition the effective or net display area of a single pixel. Use of such shield film BM makes the contour of each pixel clear and "crisp" to thereby improve the contrast. In summary, the shield film BM functions to offer optical shielding with respect to the i-type semiconductor layer AS while simultaneously serving as the black matrix for improvement on the contrast by providing partitions between color filters FIL(R), FIL(G), FIL(B).

In addition, since part of the transparent pixel electrode ITO1 which opposes the root-side edge portion in the rubbing direction is optically blocked or "shuttered" by the shield film BM, any domains that can occur at such part are invisible, which in turn ensures that the display characteristics are free from any possible degradation.

Where necessary, the backlight may alternatively be attached to the upper transparent glass substrate SUB2 while allowing the lower transparent glass substrate SUB1 to be on the observation side (external exposure side).

The shield film BM is also formed at the peripheral section to have a flat rectangular frame-like pattern which resembles a window frame in planar shape and is formed continuously with the pattern of the matrix section that has a plurality of openings or apertures in the form of dots. The shield film at this part is similar in function to the shield film SHF. The shield film BM at the periphery is extended beyond the strip spacer SPC-S toward the outside of the seal material SL, thereby precluding undesired entrance or "invasion" of leakage light, such as reflection light otherwise occurring in actually implemented equipment, such as personal computers or the like. On the other hand, this shield film BM is forced to reside inside of the edge of the upper transparent glass substrate SUB2 by approximately 0.3 to 1.0 mm and is formed to avoid passing through cut regions of the upper transparent glass substrate SUB2.

The color filters FIL(R), FIL(G), FIL(B) are comprised of a dyeing or stain base made of a resin material such as acrylic resin or the like with color development effected thereto using dyestuff. Note that the color filter FIL(B) is not depicted in FIG. 10A, 10B or 10C. These color filters FIL(R), FIL(G), FIL(B) are formed at specified positions corresponding to pixels to have a stripe shape, and are individually colored into respective colors of red (R), green (G) And Blue (B). The color filters FIL(R), FIL(G), FIL(B) are formed to have a predefined size large enough to cover all of the transparent pixel electrodes ITO1 whereas the shield film BM is formed inside of the peripheral edges of such transparent pixel electrodes ITO1 to thereby overlap those edge portions of the transparent pixel electrodes ITO1.

The color filters FIL(R), FIL(G), FIL(B) may alternatively be formed in the following way. First, a chosen dyeing base is formed on the surface of the upper transparent glass substrate SUB2; then, certain portions of the dyeing base residing in specified regions other than the red-color filter formation regions are photolithographically removed. Thereafter, the dyeing base is dyed with red dyestuff and then fixing or sticking treatment is carried out thus forming the red color filters FIL(R). Next, similar treatment processes are performed to sequentially form the green color filters FIL(G) and blue color filters FIL(B).

A protective film PSV2 is provided for preventing the dyestuff used to dye the color filters FIL(R), FIL(G), FIL(B) ]into different colors from attempting to leak into the liquid crystal layer LC. This protective film PSV2 is made of transparent resin materials typically including acrylic resin or epoxy resin or the like.

A common transparent pixel electrode ITO2 opposes transparent pixel electrodes ITO1 that are provided on the lower transparent glass substrate SUB1 in units of pixels, wherein the optical state of the liquid crystal layer LC varies or changes in response to a voltage potential difference (electric field) between each pixel electrode ITO1 and common transparent pixel electrode ITO2. This common transparent pixel electrode ITO is arranged to receive a common voltage Vcom as applied thereto. Although the common voltage Vcom is set here at an intermediate potential between a low-level drive voltage Vdmin and high-level drive voltage Vdmax applied to the image signal lines, if the power supply voltage of an integrated circuit for use in image signal line drive circuitry is required to decrease down to about half then an AC voltage may be applied thereto. Additionally, part of the planar shape of the common transparent pixel electrode IT02 is shown in FIG. 9.

It should be noted that the gate terminals GTM are composed of a chromium Cr layer g1 having excellent adhesiveness with a silicon oxide SIO layer and having a higher resistance to electrolytic corrosion than aluminum Al, and a transparent conductive layer d1 lying at the same level as the pixel electrodes ITO1 (same layer, simultaneous fabrication) while protecting the surface of the former. Also note that conductive layers d2 and d3 that are formed on the gate insulation film GI and sidewalls thereof are the ones which reside as a result of coverage of such regions by a photoresist to preclude the conductive layers g2 and g1 from being etched away due to presence of pinholes during etching of such conductive layers d2 and d3. Additionally the ITO layer d1 that is designed to extend in the right direction beyond the gate insulation film GI is for further enhancing such similar remedy.

As shown in FIG. 9, the drain terminals DTM constitute a terminal group Td (suffix omitted), which terminals are arranged to further extend beyond a cut line CT1 of the lower transparent glass substrate SUB1 and all of which are electrically short-circuited together by a lead SHd in order to prevent electrostatic breakdown or destruction during the manufacturing processes.

The drain terminals DTM are each formed of two layers including a chromium Cr layer g1 and ITO layer d1 for the same reasons as in the gate terminals GTM and are connected to an image signal line DL at a specified part from which the gate insulation film GI has been removed away. The semiconductor layer AS is formed to overlie the edge of the gate insulation film GI for image-signal etching the edge of the gate insulation film GI into a tapered shape. Of course, the protective film PSV1 for providing interconnection with external circuitry has been removed at locations overlying the drain terminals DTM.

Figure 11:
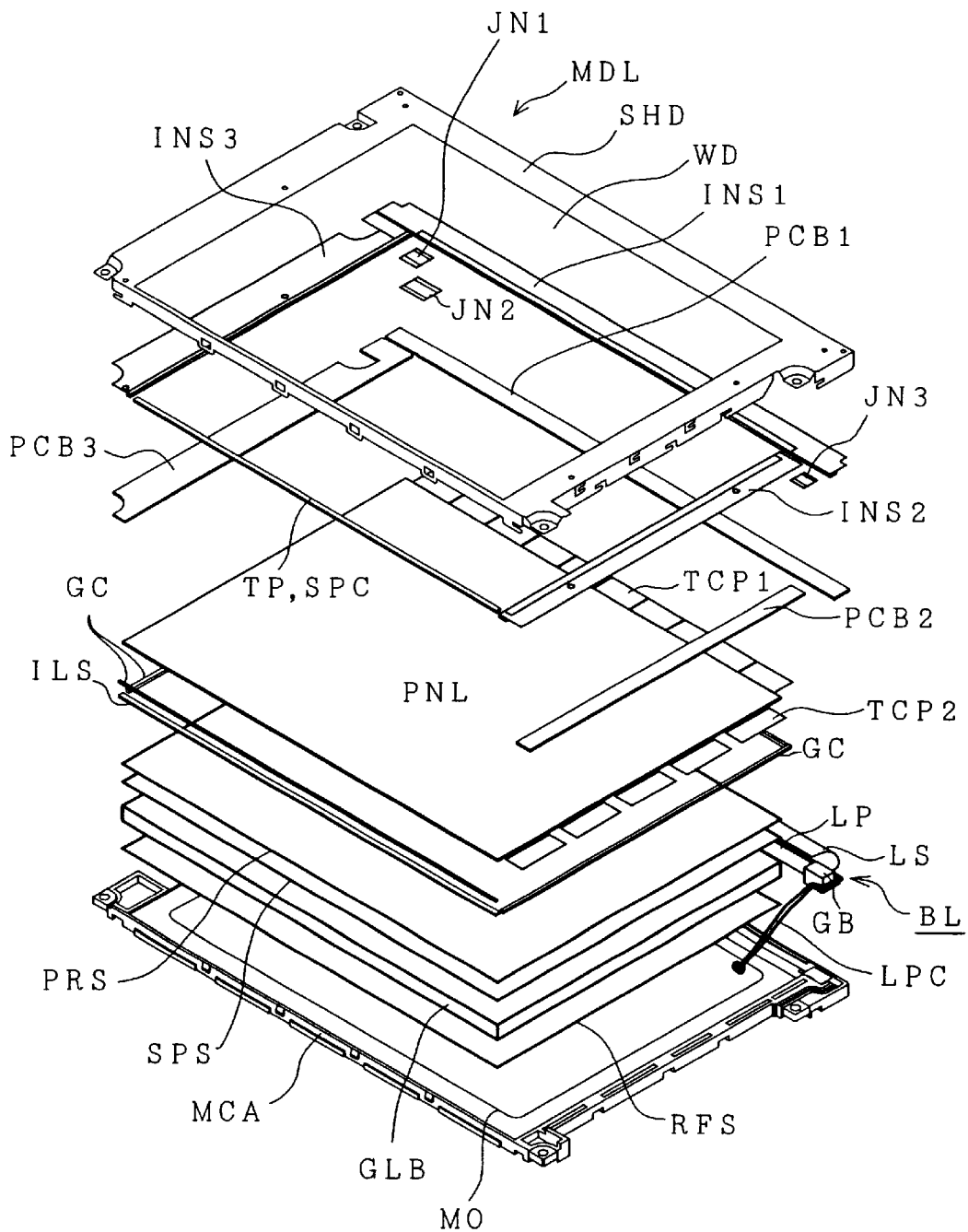
FIG. 11 is an exploded perspective view of a direct-view liquid crystal display apparatus employing a liquid crystal display device of the invention.

FIG. 11 is an exploded perspective view of the overall structure of a direct-view liquid crystal display device employing the liquid crystal display device in accordance with the present invention.

The liquid crystal display device shown herein represents one actually implemented structure of a liquid crystal display device (liquid crystal display module) with its liquid crystal panel and circuit boards plus backlight unit along with other components associated therewith assembled together integrally.

In FIG. 11, "SHD" designates an upper frame (also known as a shield casing, or metal frame) made of a metal plate; WD denotes a display window; INS1–3 indicate dielectric sheets; PCB1–3 represent printed circuit boards (PCB1 is a drain-side circuit board for use as an image signal line driver circuit board, PCB2 is a gate-side circuit board, and PCB3 is an interface circuit board); JN1–3 are joiners for electrical connection among the circuit boards PCB1–3; TCP1, TCP2 are tape carrier packages; PNL denotes a liquid crystal panel using the pole spacers and strip spacer that have been described in the embodiment for setup of a prespecified cell gap; POL denotes upper polarizer plate; GC denotes a rubber cushion; ILS denotes an optical shielding spacer (corresponding to the shield film SHF in FIG. 1); PRS denotes a prism sheet; SPS denotes a diffuser sheet; GLB denotes a light guide plate; RFS denotes a reflection sheet; MCA denotes a lower frame formed by all-at-a time machining of resin (also called a lower casing, or mold frame); MO denotes an opening or aperture of the MCA; BAT denotes both-side adhesive tape, wherein diffuser plate members are laminated over one another to assemble the liquid crystal display device MDL. In addition, a light source assembly consisting of a fluorescent tube LP and reflector sheet LS is disposed along one side of the light guide plate GLB, which is electrically fed from a backlight power supply unit, not shown, via a lamp cable LPC that is extended from the rubber cushion GC portion as provided at the edge of the fluorescent tube LP. The light guide plate GLB and the light source assembly makes up the backlight BL. Additionally, the light source assembly may alternatively be provided along two sides or four sides of the light guide plate GLB.

This liquid crystal display device (liquid crystal display module MDL) has an enclosure or housing that consists essentially of two kinds of receiving/retainment members, which constitute the lower frame MCA and upper frame SHD, and is arranged so that the dielectric sheets INS1–3 and circuit boards PCB 1–3 plus liquid crystal panel PNL are immovably received therein while engaging with the upper frame SHD and the lower frame MCA with the backlight including the light guide plate GLB and others.

Mounted on the image signal line driver circuit board PCB1 are several electronics components including but not limited to integrated circuit chips for use in driving respective pixels on the liquid crystal panel PNL, whereas the interface circuit board PCB3 mounts thereon integrated circuit chips for use in receiving image signals from an external host computers) and also for receiving control signals such as timing signals and the like, more than one timing converter (TCON) for generation of a clock signal or signals by processing the timing, one or more low-voltage differential signal chips, and other electronic parts or components typically including capacitors and resistors or any equivalents thereto.

A clock signal which is generated and issued from the timing converter is then supplied to built-in driver circuit chips (integrated circuit chips) mounted on the image signal line driver circuit board PCB 1.

The interface circuit board PCB3 and image signal line driver circuit board PCB1 are multilayer printed circuit boards, wherein the clock signal lines CLL are formed as inner leads of the interface circuit board PCB3 and image signal line driver circuit board PCB1.

It is noted that the drain-side circuit board PCB1 for use in driving the TFTs and th e gate-side circuit board PCB2 plus interface circuit board PCB3 are connected by the tape carrier packages TCP1, TCP2 to the liquid crystal panel PNL while using the joiners JN1, 2, 3 to connect between respective circuit boards.

With this liquid crystal display device, it becomes possible to obtain high-quality image displayability with on-screen visual irregularities being suppressed or minimized.

Figure 12:
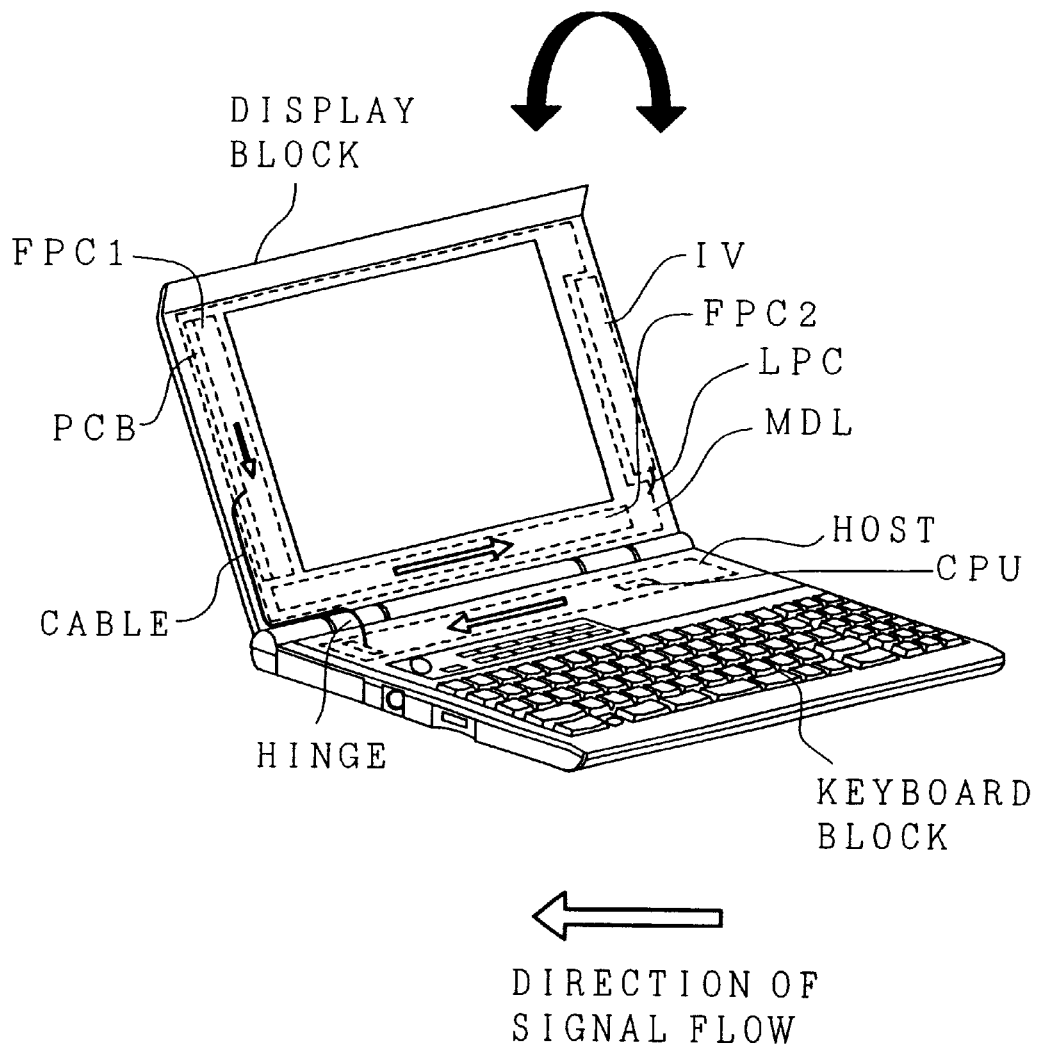
FIG. 12 is a perspective view of a notebook computer for explanation of one embodiment of the liquid crystal display device of FIG. 11.

FIG. 12 depicts a perspective view of a notebook personal computer (PC) also embodying the invention, which employs the liquid crystal display device shown in FIG. 11.

This notebook computer (handheld or mobile PC) consists essentially of a keyboard unit (main body) and a display unit as foldably coupled via hinges to the keyboard unit. The keyboard unit has a keyboard on its top faceplate and contains therein a host (host computer) along with signal generation functions achieved by a microprocessor such as a CPU or the like, while the display unit has the liquid crystal panel PNL assembled together with a PCB mounting thereon driver circuit boards FPC1, FPC2 and controller chip TCON as well as an inverter power supply board IV used as the backlight power supply, which are received near or around the liquid crystal panel PNL.

Each of the electronic equipment with the liquid crystal display device built therein is capable of offering enhanced displayability of high-quality images with visual irregularities greatly suppressed or eliminated because of the fact that its liquid crystal panel's cell gap has less variation.

As apparent from the foregoing, according to the present invention, it is possible to provide a high-quality liquid crystal display device with reliability increased, wherein since the columnar or pole-like spacers are provided at selected positions excluding the pixel electrodes in a display area while at the same time providing the zonal or band strip-shaped spacer at the sealing portions around the display area between two insulative substrates for permitting deposition or coating of a seal material at outer edges of this strip spacer which is later hardened, it is possible to uniformly control the cell gap over almost the entire screen area. In addition, because a liquid crystal material constituting the liquid crystal layer will no longer come into contact with the seal material being used, contamination of the liquid crystal material due to such seal material may be eliminated. Furthermore, use of no fillers for the seal material makes it possible to avoid damage such as undesired open-circuiting of electrode extension leads.

What is claimed is:

1. A liquid crystal display device comprising:

a first substrate having a display area, said display area having metallic pixel electrodes in the form of a matrix;

a second substrate having a transparent electrode opposing said first substrate with a gap between the first and second substrates;

a liquid crystal layer made of a liquid crystal material sealed in the gap between said first and second substrates;

an alignment layer on at least one of surfaces of said first and second substrates in contact with said liquid crystal layer for controlling alignment of said liquid crystal material;

a plurality of columnar spacers in said display area of said first substrate for retaining the gap between said first and second substrates;

an optical shield film provided outside of said display area and made of the same metallic layer as said metallic pixel electrodes, said optical shield film having a width greater than a width of each of said metallic pixel electrodes;

a zonal spacer surrounding said display area and being the same in material as said columnar spacers and having a width greater than a diameter of each columnar spacer and formed over said optical shield film; and a sealing material filled at outer edges of said zonal spacer for adhesively fixing said first and second substrates together.

2. A liquid crystal display device according to claim 1, wherein said columnar spacers and said zonal spacer are made of a resist material.

3. A liquid crystal display device according to claim 1, wherein said columnar spacers and said zonal spacer are made of a photolithographically fabricated resist material.

4. A liquid crystal display device comprising:

a first substrate;

metallic pixel electrodes provided on said first substrate;

a display area comprising said pixel electrodes laid out in the form of a matrix;

a second substrate spatially opposing said first substrate with a gap therebetween;

a liquid crystal layer provided between the first and second substrates;

a plurality of pillar or pole-like spacers provided in the display area of said first substrate for keeping the gap between the substrates;

an optical shield film provided outside of said display area and made of the same metallic layer as said metallic pixel electrodes, said optical shield film having a width greater than a width of each of said metallic pixel electrodes;

a strip or band-like spacer surrounding said display area and being made of the same material as that of said pole-like spacers and formed over said optical shield film; and a seal material formed at outer edges of said band-like spacer for allowing said first and second substrates to be immovably bonded together.

5. A liquid crystal display device according to claim 4, wherein said band-like spacer has its width greater than a diameter of said pole-like spacers.

6. A liquid crystal display device comprising:

a first substrate;

a matrix of rows and columns of reflective pixel electrodes on said first substrate;

a display area with said pixel electrodes provided therein;

an optical shield film made of the same metallic layer as said reflective pixel electrodes and being provided outside of said display area, said optical shield film having a width greater than a width of each of said reflective pixel electrodes;

a second substrate disposed opposite said first substrate with a gap therebetween;

a liquid crystal layer provided between the first and second substrates;

a columnar spacer formed over said first substrate and provided between two neighboring ones of the reflective pixel electrodes of said first substrate; and a zonal spacer formed over the optical shield film at a location outside of said display area.

7. A liquid crystal display device according to claim 6, further comprising:

a seal material provided outside of said zonal spacer for adhesively fixing said first and second substrates together.

* * * * *